(12) United States Patent
Berthelet et al.

(10) Patent No.: US 6,490,899 B2
(45) Date of Patent: Dec. 10, 2002

(54) METHOD AND APPARATUS FOR PEENING TOPS OF COOLED BLADES

(75) Inventors: Benoît Jean Henri Berthelet, Maisons Alfort (FR); Francis Lucien Guy Chareyre, Franconville (FR); Willy Lionel Fradin, Vaux sur Vienne (FR); Hakim Hoffmann, Naintre (FR); Stéphane Michel Kerneis, Velizy (FR); Marie-Christine Marcelle Ntsama-Etoundi, Charenton le Pont (FR); Guillaume François Roger Simon, Montigny le Bretonneux (FR)

(73) Assignees: SNECMA Moteurs, Paris (FR); SNECMA Services, Paris (FR)

( * ) Notice: Subject to any disclaimer, the term of this patent is extended or adjusted under 35 U.S.C. 154(b) by 0 days.

(21) Appl. No.: 09/987,856

(22) Filed: Nov. 16, 2001

(65) Prior Publication Data

US 2002/0056303 A1 May 16, 2002

(30) Foreign Application Priority Data

Nov. 16, 2000 (FR) .............................. 00 14766

(51) Int. Cl.[7] .............................. B24B 1/04; B21J 1/00; C21D 7/06
(52) U.S. Cl. ...................... 72/53; 416/241 R; 29/90.7; 451/38
(58) Field of Search ............................ 72/53, 430, 707; 416/241 R, 128.5; 29/90.7; 451/38

(56) References Cited

U.S. PATENT DOCUMENTS

| | | | | |
|---|---|---|---|---|
| 3,482,423 | A | * 12/1969 | Murray et al. | ................. 451/38 |
| 3,668,913 | A | *  6/1972 | Morris | ......................... 72/53 |
| 4,419,875 | A | * 12/1983 | DeClark et al. | ............... 72/53 |
| 4,426,867 | A |   1/1984 | Neal et al. | |
| 4,829,720 | A |   5/1989 | Cavalieri | |
| 5,620,307 | A | *  4/1997 | Mannava et al. | ........ 416/241 R |
| 5,846,057 | A | * 12/1998 | Ferrigno et al. | ......... 416/241 R |
| 5,950,470 | A | *  9/1999 | Prewo et al. | .................. 72/430 |
| 6,170,308 | B1 | *  1/2001 | Veronesi et al. | ............. 29/90.7 |
| 6,289,705 | B1 |   9/2001 | Duquenne et al. | |
| 6,336,844 | B1 |   1/2002 | Duquenne et al. | |
| 6,340,500 | B1 | *  1/2002 | Spitsberg | ........................ 72/53 |

FOREIGN PATENT DOCUMENTS

| | | |
|---|---|---|
| EP | 1 101 568 A1 | 5/2001 |
| FR | 2 714 629 | 7/1995 |

* cited by examiner

Primary Examiner—David Jones
(74) Attorney, Agent, or Firm—Oblon, Spivak, McClelland, Maier & Neustadt, P.C.

(57) ABSTRACT

A method for peening the tops of cooled blades which include cooling air passage orifices. Peening is performed by mobilization of a plurality of beads in a sealed chamber containing at least one blade tip. The plurality of beads is mobilized by the active surface of a sonotrode which delimits part of said chamber. The beads have a diameter greater than that of the cooling air passage orifices.

5 Claims, 2 Drawing Sheets

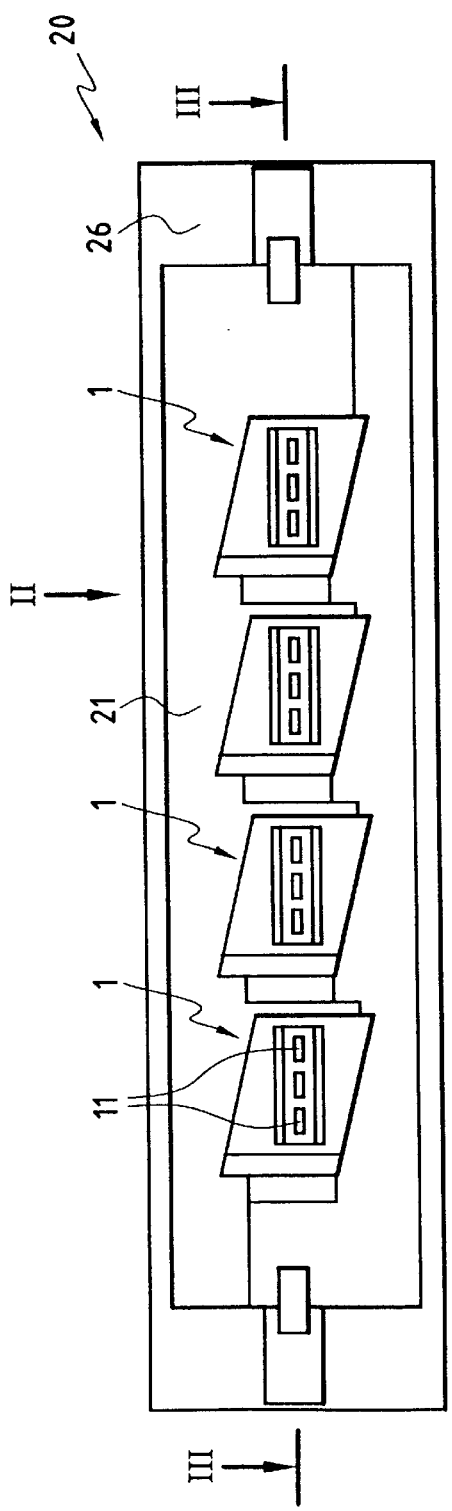
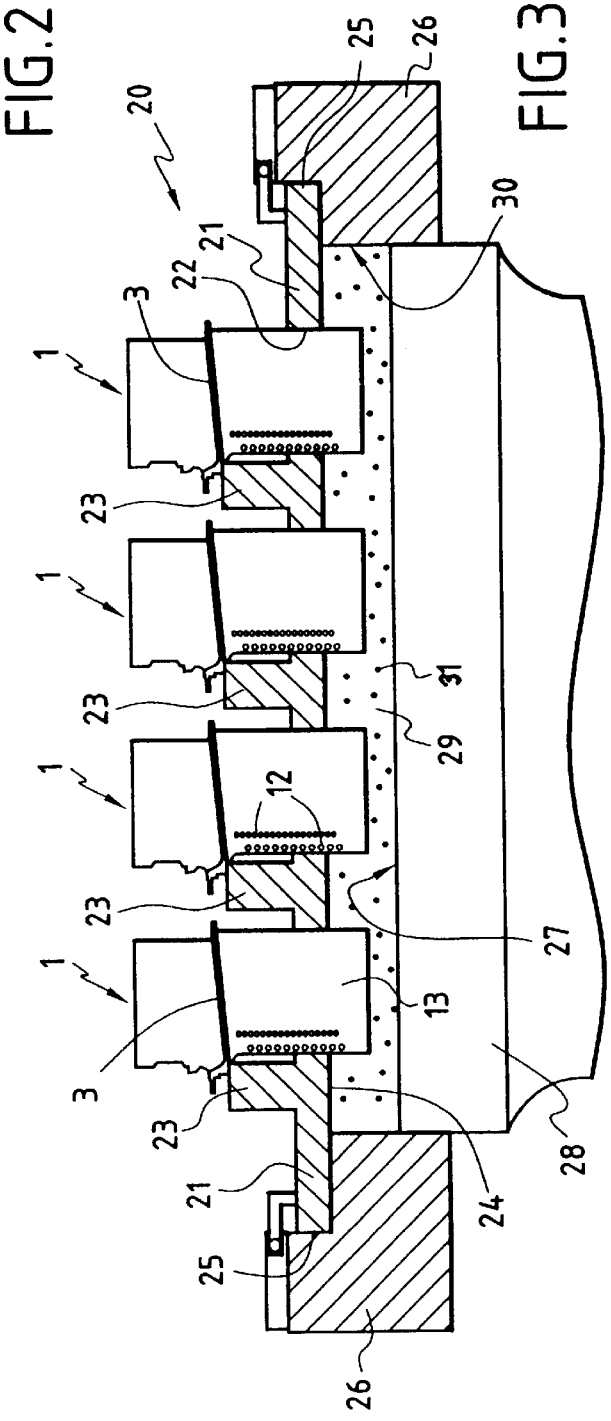

METHOD AND APPARATUS FOR PEENING TOPS OF COOLED BLADES

BACKGROUND OF THE INVENTION

1. Field of the Invention

The invention relates to a method for the surface treatment and compressive prestressing by peening of the tops and aerodynamic surfaces of cooled blade tips, which include a cavity in their tops, said blades being hollow and having an internal cooling circuit communicating with the outside via cooling air passage orifices formed, in particular, in said tops and said aerodynamic surfaces.

2. Technical Background

A cooled blade, for example a jet engine turbine blade, is hollow and comprises a root portion for securing the blade to a rotor, and an airfoil portion. The root has a sizeable opening through which a flow of cooling air tapped from a compressor stage is injected. The blade airfoil includes, on a leading edge, on a trailing edge, on flanks and on the top, small orifices which allow the cooling air, which is heated-up as it flows inside the blade, to be removed so as to be replaced with fresh cooling air, and which allow the conveying of this heated-up cooling air onto an exterior surface of the blade to isolate it from combustion gases of the jet engine. These orifices, which may be cylindrical or may be in the form of slots, have relatively small transverse dimensions, at most equal to 1 mm. Furthermore, the aerodynamic surfaces comprising the leading edge, the trailing edge, and the flanks are generally extended at the top of the blade by an exterior wall forming, at the top of the blade, a cavity which is open toward the top.

Turbine blades in operation are subjected to considerable centrifugal forces and to high thermal stresses. Hence, it is necessary to compressively prestress the external surfaces of the aerofoils so as to delay the onset of cracks detrimental to the integrity and life of these blades, and particularly the surfaces at the top of the blades which are subjected to the greatest centrifugal forces.

This compression is also needed in the case of blades whose tops have been repaired. Repairing the top of a blade includes the steps of building up the uneven regions using weld metal, in practice by TIG electric arc welding. This build-up is followed by machining to reconstruct the shape of the blade, and then by peening, by blasting beads or shot, so as to compress the surface of the built-up regions and prevent the appearance of cracks at the welds during the subsequent heat treatments and when the blade is in use.

When the top of the blade has a cavity open toward the top, the inside of a wall delimiting this cavity has also to be peened.

SUMMARY OF THE PRIOR ART

At the present time, the surfaces of the blade tips are compressively prestressed by peening using beads ejected by air jet peening nozzles. These nozzles are able to project only beads the diameter of which is smaller than 1 mm, and typically between 0.1 and 0.5 mm. It is therefore necessary to plug the blade cooling orifices, prior to peening, to prevent the beads from entering them. The top of the blade is then offered up to one or more air jet peening nozzles and the nozzles are moved in order to make the peening uniform. After the peening operation, the cooling orifices have to be unplugged.

It is also possible for peening to take place without plugging the orifices during the operation. In such a case, it is then necessary, for example by dissolving them in acid, to remove any beads which may remain in the cooling orifices or may have entered the interior cavity of the blade.

Peening with nozzles takes a great deal of time since the beads are of small diameter they have low kinetic energy. Furthermore, the small diameter of the beads. leads to damage to the surface finish of the blade.

During peening, the nozzle has to be moved in various orientations, so as to reach the entire peripheral wall of the top of the blade and also the interior wall of the upwardly open cavity when there is one. When peening is performed by hand, it is, by nature, not very repeatable. When peening is automated, it entails control over numerous parameters, and is therefore difficult to control and to repeat.

It is also known practice for peening to be carried out using flappers equipped with beads. This method, known as "flapper peening", includes the step of using a small spindle comprising, at its end, strips of plastic, to the end of which beads are bonded. Peening is performed by rotating the spindle. As the beads are held on the strips, they do not enter the cooling orifices. The disadvantage with this method is that the tool soon degrades as beads are torn off and the strips become frayed, and that, above all, it is not possible effectively to peen the interior of the open cavity at the top of the blade.

It is an object of the invention to propose a method for peening blade tips which makes it possible to repeatedly create identical prestresses in a relatively short peening time.

It is another object of the invention to propose a method for peening blade tips which eliminates the operations of plugging and unplugging the cooling air passage orifices before and after the peening operation respectively.

According to the invention, there is provided a method for the surface treatment and compressive prestressing by peening of the tops and aerodynamic surfaces of cooled blade tips which include a cavity in their tops, said blades being hollow and having an internal cooling circuit communicating with the outside via cooling air passage orifices formed in said tops and said aerodynamic surfaces, said method comprising the steps of providing a sonotrode having a vibratory surface and ultrasonic means for vibrating said vibratory surface, placing a plurality of beads on said vibratory surface of said sonotrode, said beads having a diameter greater that that of said cooling air passage orifices, providing means for supporting at least one blade, said supporting means and said vibratory surface of said sonotrode together at least partly defining a sealed chamber containing at least one blade tip, and operating said ultrasonic means to vibrate said vibratory surface of said sonotrode whereby said beads are mobilized in said chamber to conduct ultrasonic peening of said at least one blade tip.

According to a preferred embodiment, said beads have a diameter of between 0.8 and 5 mm.

Since the beads have a diameter greater than that of the cooling air passage orifices, it is not necessary to carry out the operations of plugging and unplugging these orifices, and the increased kinetic energy of the beads relative to the beads of the prior art allows the peening time to be reduced.

Furthermore, the mobilized plurality of beads moving in random directions strike the surfaces of the blade tip at varying angles, and this improves the surface finish by comparison with beads projected by a nozzle in a predominant direction, this being especially the case since the beads used in the method according to the invention have a diameter greater than the diameter of the beads that can be projected by a nozzle.

Finally, all the external surfaces of the blade tip exposed in the chamber are subjected at the same time to the impacts of the beads, and this considerably reduces the risk of blade tip deformation.

The invention also provides an apparatus for carrying out the method according to the invention, said apparatus comprising a blade support plate having at least one through-orifice, the cross section of which matches the cross section of the end of a blade aerofoil, a frame, on one face of which said support plate can be fixed, and a sonotrode, a vibratory surface of which is capped by said support plate fixed to said frame, said vibratory surface of said sonotrode being arranged facing said support plate.

According to the invention, there is also provided a method for repairing blades, said method comprising the steps of building up uneven regions of said blade with weld metal, machining said blade to reconstitute the shape of the blade, and peening said blade according to the method of claim 3 so as to prevent the appearance of cracks at said welds during subsequent heat treatments and when said blade is in use.

BRIEF DESCRIPTION OF THE DRAWINGS

FIG. 2 is a plan view from above of blade supporting apparatus for carrying out a method according to the invention;

FIG. 3 is a view in section on III—III of FIG. 2 of the blade supporting apparatus capping an active surface of a sonotrode.

DESCRIPTION OF THE PREFERRED EMBODIMENT

Figure 1:
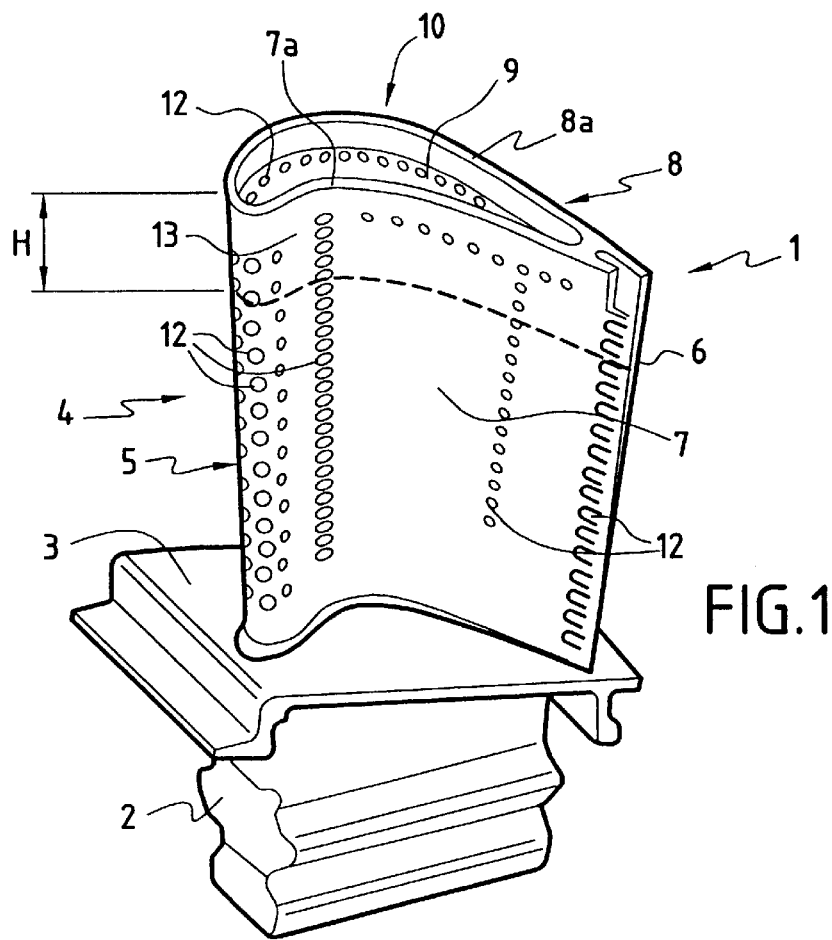
FIG. 1 is perspective view of a cooled jet engine turbine blade.
Figure 4:
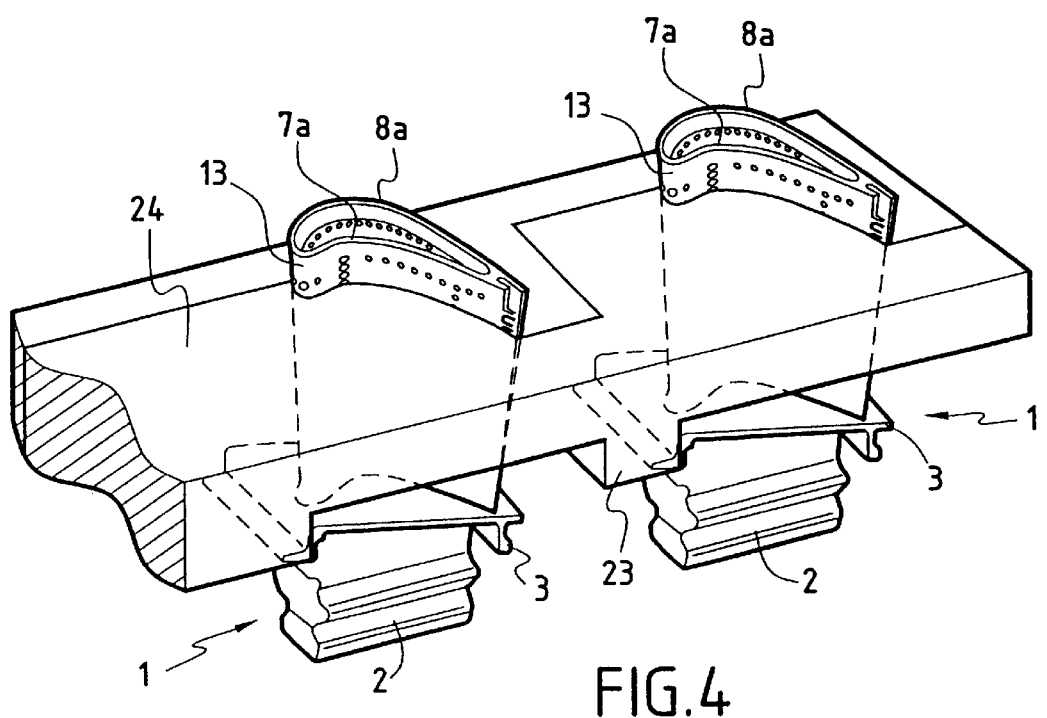
FIG. 4 is a perspective view of a support plate on which two blades are mounted.

FIG. 1 shows a cooled blade 1, for example a jet engine turbine blade, which has a root 2 for fixing said blade 1 into a groove formed in a peripheral wall of a turbine rotor, a platform 3 surmounting the blade root 2 and internally delimiting a combustion gases flow path from a combustion chamber, and an aerofoil 4 of aerodynamic shape which extends from the platform and which, at the upstream end in the direction of the flow of the combustion gases has a leading edge 5, and at the downstream end has a trailing edge 6, this leading edge 5 and this trailing edge 6 being connected in a known way by a pressure face 7 and a reduced-pressure face 8. The aerofoil 4 is closed off at its outer end or top by a wall 9 arranged below the outer ends 7a, 8a of the pressure face 7 and of the reduced-pressure face 8. These outer ends, together with the wall 9, delimit a cavity 10, and, together with a stator casing, seal the combustion gases flow path.

The blade 1 is hollow and has an internal cooling air circuit supplied by large-sized orifices 11 formed in the blade root 2. Cooling air passage orifices 12 are formed in the leading edge 5, the trailing edge 6, the pressure face 7, the reduced-pressure face 8 and the top wall 9. These orifices 12 may be circular or may be in the form of slots. In the case of circular orifices 9, their diameter is at most equal to 1 mm and, in the case of slots, their transverse dimension is at most equal to 1 mm.

The apparatus 20 essentially comprises a support plate 21 for supporting several blades 1. This plate 21 has through-orifices 22, the cross section of which is substantially the same as the cross section of the end of an airfoil 4, and, on one of its faces, rests 23 for the platforms 3, designed so that when an end of an airfoil is introduced into an orifice 22, and the associated platform 3 of the blade 1 rests on a rest 23, the outer end region 13 of said blade 1 emerges from a face 24 of the support plate 21 which is the face opposite to that having the rests 23.

FIGS. 2 and 3 show an example of an apparatus 20 for carrying out the method.

The apparatus 20 essentially comprises a support plate 21 for supporting several blades 1. This plate 21 has through-orifices 22, the cross section of which is substantially the same as the cross section of the end of an aerofoil 4, and, on one of its faces, rests 23 for the platforms 3, designed so that when an end of an aerofoil is introduced into an orifice 22, and the associated platform 3 of the blade 1 rests on a rest 23, the outer end region 13 of said blade 1 emerges from a face 24 of the support plate 21 which is the face opposite to that having the rests 23.

The support plate 21, which has a rectangular overall shape, is intended to be fixed in a rebate 25 formed on one face of a frame 26, the thickness of which exceeds the height H of the outer end region 13 of the blades 1 carried by the support plate 21.

The frame 26, when equipped with the support plate 21, caps a vibratory surface 27 of a sonotrode 28 which may be excited by means for producing ultrasonic oscillations, which means are not depicted in the drawings. The vibratory surface 27 is arranged facing the support plate 21 and at a small distance from the outer ends of the blade aerofoils 4. The vibratory surface 27 constitutes an active wall of a chamber 29 that is delimited by an interior wall 30 of the frame 26 and by the face 24 of the support plate 21.

A plurality of beads 31, with a diameter greater than the diameter of the cooling air passage orifices 12 in the blades 1, and typically of between 0.8 and 5 mm, are introduced into the chamber 29. A clearance between the interior wall 30 of the frame 26 and the periphery of the vibratory surface 27 is smaller than the diameter of a bead. The beads 31 cannot thus escape from the chamber 29.

When the vibratory surface 27 is subjected to ultrasonic oscillations, the plurality of beads is mobilized in the chamber 29. The beads 31 bounce off the interior wall 30 of the frame 26 and the face 24 of the support plate 21. The walls of the outer end regions 13 of the blades 1 are thus struck by a number of beads.

The frequency of the ultrasonic waves, the dimensions of the vibratory surface 27 of the sonotrode 28, and of the frame 26, and the acoustic energy are calculated to be such that the end regions 13 of the blades are peened uniformly and in a very short peening time.

We claim:

1. A method for the surface treatment and compressive prestressing by peening of an outer end region of said airfoil and aerodynamic surfaces of cooled blade tips which include a cavity in top portions thereof, said blades being hollow and having an internal cooling circuit communicating with an outside location of the airfoil via cooling air passage orifices formed in said tops and said aerodynamic surfaces, said method comprising the steps of:

a) providing a sonotrode having a vibratory surface and ultrasonically vibrating said vibratory surface;

b) placing a plurality of beads on said vibratory surface of said sonotrode, said beads having a diameter greater than that of said cooling air passage orifices; and c) supporting at least one blade, a supporting member and said vibratory surface of said sonotrode together and at least partly defining a sealed chamber containing at least one blade tip;

d) said vibrating of said vibratory surface of said sonotrode immobilizing said beads in said chamber and ultrasonic peening said at least one blade tip.

2. A method according to claim 1, in which said beads have a diameter of between 0.8 and 5 mm.

3. A method according to claim 2, in which said chamber contains several blade tips.

4. An apparatus for treating a blade, comprising a blade support plate having at least one through-orifice, a cross section of which matches a cross section of an end of a blade airfoil, a frame, on one face of which said support plate is fixed, and a sonotrode having a vibratory surface which is capped by said support plate fixed to said frame, said vibratory surface of said sonotrode being arranged facing said support plate.

5. A method for repairing a blade comprising the steps of:

building up uneven regions of a blade with weld metal;

machining said blade to reconstitute the shape of the blade; and peening said blade so as to prevent an appearance of cracks at said weld metal during subsequent heating treatments and when said blade is in use.

* * * * *